(12) United States Patent
Chung et al.

(10) Patent No.: US 12,403,739 B2
(45) Date of Patent: Sep. 2, 2025

(54) TRANSPORTING ROBOT

(71) Applicants: Hyundai Motor Company, Seoul (KR); Kia Corporation, Seoul (KR)

(72) Inventors: Jae Hoon Chung, Seoul (KR); Jong Min Oh, Hwaseong-si (KR); Ji A Lee, Seoul (KR); Ki Seok Sung, Seongnam-si (KR); Jong Kyu Choi, Yongin-si (KR); Young Jun Byun, Seoul (KR); Kye Yoon Kim, Gunpo-si (KR); Ji Min Han, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 561 days.

(21) Appl. No.: 17/897,851

(22) Filed: Aug. 29, 2022

(65) Prior Publication Data
US 2023/0286344 A1 Sep. 14, 2023

(30) Foreign Application Priority Data
Mar. 8, 2022 (KR) .......................... 1020220029289

(51) Int. Cl.
| | | |
|---|---|---|
| *B60G 17/016* | (2006.01) | |
| *B60G 3/14* | (2006.01) | |
| *B60G 7/00* | (2006.01) | |
| *B60G 17/019* | (2006.01) | |
| *B60K 7/00* | (2006.01) | |
| *B60P 1/64* | (2006.01) | |
| *B60P 7/08* | (2006.01) | |

(52) U.S. Cl.
CPC .......... *B60G 17/0164* (2013.01); *B60G 3/14* (2013.01); *B60G 7/006* (2013.01); *B60G 17/01908* (2013.01); *B60K 7/0007* (2013.01); *B60P 1/6418* (2013.01); *B60P 7/08* (2013.01); *B60G 2500/30* (2013.01)

(58) Field of Classification Search
CPC ...... B60G 17/0164; B60G 3/14; B60G 7/006; B60G 17/01908; B60G 2500/30; B60K 7/0007; B60P 1/6418; B60P 7/08
See application file for complete search history.

(56) References Cited

U.S. PATENT DOCUMENTS

| | | | |
|---|---|---|---|
| 4,763,910 A | | 8/1988 | Brandli et al. |
| 5,515,934 A | * | 5/1996 | Davis .................. B62D 57/024 |
| | | | 901/50 |
| 9,346,497 B2 | * | 5/2016 | Dames ............... B62D 49/0678 |

(Continued)

FOREIGN PATENT DOCUMENTS

| | | |
|---|---|---|
| CN | 204409075 | 6/2015 |
| CN | 107515614 | 12/2017 |

(Continued)

*Primary Examiner* — Jacob B Meyer
(74) *Attorney, Agent, or Firm* — Fish & Richardson P.C.

(57) ABSTRACT

A transporting robot is utilized for rapid and efficient logistics and transportation. The transporting robot includes a main body having a flat upper surface, support frames that are respectively provided on both sides of the main body, extend downwardly, and define a predetermined angle with respect to the upper surface of the main body, a leg rotatably installed on the support frame, and a wheel installed at an end of the leg. The leg is configured to be folded below the main body, raised toward the main body, or unfolded outside of the main body.

16 Claims, 6 Drawing Sheets

(56) References Cited

U.S. PATENT DOCUMENTS

| | | | |
|---|---|---|---|
| 10,207,561 B2* | 2/2019 | Baumgartner | B60G 3/207 |
| 11,235,824 B2* | 2/2022 | Ishikawa | B62D 61/12 |
| 11,858,567 B2* | 1/2024 | Bae | B62D 57/028 |
| 2019/0241037 A1* | 8/2019 | Hays | B60B 19/00 |
| 2023/0286344 A1* | 9/2023 | Chung | B62D 57/028 |
| 2023/0380321 A1* | 11/2023 | López | A01B 51/026 |
| 2024/0217296 A1* | 7/2024 | Wang | B62D 61/12 |
| 2024/0351710 A1* | 10/2024 | Fu | B64G 1/16 |

FOREIGN PATENT DOCUMENTS

| | | | |
|---|---|---|---|
| CN | 210366813 | 4/2020 | |
| CN | 211893464 | 11/2020 | |
| JP | 2006273100 | 10/2006 | |
| KR | 20120097212 | 9/2012 | |
| WO | WO-9608959 A1 * | 3/1996 | A01G 23/08 |
| WO | WO-2023051857 A1 * | 4/2023 | B60G 17/0164 |
| WO | WO-2025068683 A1 * | 4/2025 | B62D 57/022 |

* cited by examiner

TRANSPORTING ROBOT

CROSS-REFERENCE TO RELATED APPLICATION(S)

This application claims benefit of priority to Korean Patent Application No. 10-2022-0029289, filed on Mar. 8, 2022, in the Korean Intellectual Property Office, the disclosures of which are incorporated herein by reference in their entirety.

TECHNICAL FIELD

The present disclosure relates to a transporting robot for transporting cargo.

BACKGROUND

Various methods may be used to transport cargo using an aircraft. For example, along with drones for transporting small cargoes, a Cargo Unmanned Aerial System (CUAS) may transport medium-sized cargoes.

In some cases, in order to transport cargo in an aircraft, a container and a transporting means may be used to load and unload cargo having an arbitrary shape into and from the aircraft.

SUMMARY

The present disclosure describes a transporting robot that can be utilized for rapid and efficient logistics and transport.

According to one aspect of the subject matter described in this application, a transporting apparatus includes a main body having an upper surface that is flat and a plurality of support frames that are disposed at sides of the main body and extend downward from the main body, where each of the plurality of support frames is inclined with respect to the upper surface of the main body. The transporting apparatus further includes a plurality of legs that are rotatably disposed at each of the plurality of support frames, and a plurality of wheels, where each of the plurality of wheels is disposed at an end of one of the plurality of legs. Each of the plurality of legs is configured to rotate to (i) a first position below the main body, (ii) a second position outside of the main body, or (iii) a third position between the first position and the second position.

Implementations according to this aspect can include one or more of the following features. For example, each of the plurality of legs can include a rotation shaft rotatably coupled to one of the plurality of support frames, a first motor connected to an end portion of the rotation shaft, a bushing that is fixed to the rotation shaft and extends in a direction perpendicular to the rotation shaft, and an arm having a first end portion coupled to the bushing, where the arm is configured to rotate relative to one of the plurality of support frames. Each of the plurality of legs can further include a second motor disposed at the bushing and configured to rotate of the arm, where the second motor is connected to the first end portion of the arm. Each of the plurality of legs can further include a wheel shaft that is rotatably coupled to a second end portion of the arm and supports one of the plurality of wheels.

In some implementations, the wheel can include an in-wheel motor disposed in the wheel. In some examples, the transporting apparatus can further include a controller that is electrically connected to the first motor, the second motor, and the in-wheel motor, and a charger disposed at the main body and configured to provide power to at least one of the first motor, the second motor, or the in-wheel motor.

In some implementations, the plurality of support frames can have (i) upper ends that are connected to the main body and (ii) lower ends that extend downward from the upper ends and away from each other. The lower ends of the plurality of support frames can be configured to, based on the leg being disposed at the first position below the main body, contact a ground such that the wheel is accommodated at a position below the main body and between the plurality of support frames. The lower ends of the plurality of support frames can be further configured to, based on the leg being disposed at the second position outside of the main body, be disposed at an outside of the support frame to thereby deviate the wheel from the position below the main body. The lower ends of the plurality of support frames can be further configured to, based on the leg being disposed at the third position in an upright position with respect to the ground, define maximum heights of the support frame and the main body from the ground.

In some implementations, the transporting apparatus can be one of a plurality of transporting apparatuses including a first transporting apparatus and a second transporting apparatus. In some examples, the second transporting apparatus can be configured to, based on legs of the first transporting apparatus rotating to a position below a main body of the first transporting apparatus, move onto the first transporting apparatus and stack on the first transporting apparatus.

In some implementations, the transporting apparatus can include an acceleration sensor electrically connected to the controller and configured to maintain the main body in a horizontal attitude, where the controller is configured to, based on the acceleration sensor sensing an inclination of the main body with respect to the horizontal attitude, control the first motor to raise or lower at least one of the plurality of legs.

In some examples, the transporting apparatus can include a fastening protrusion disposed at the upper surface of the main body and configured to protrude upward relative to the upper surface of the main body and to retract downward into the main body, where the fastening protrusion is configured to couple to a container that is configured to accommodate cargo. The main body can define a groove portion configured to receive the fastening protrusion, and the fastening protrusion includes a fastening member disposed in the groove portion, and a driver disposed in the main body and configured to reciprocate the fastening member relative to the upper surface of the main body.

In some implementations, the transporting apparatus can include a charger disposed at the main body and configured to store electric energy, where the fastening member is made of a conductive material and electrically connected to the charger in the main body. In some examples the fastening member can define a rack gear on at least one surface thereof, and the driver can include a motor that is configured to receive power from the charger and includes a rotation shaft, and a pinion gear engaged with the rack gear and configured to rotate the rack gear based on rotation of the rotation shaft.

In some examples, the container can define a concave groove that is recessed upward from a lower surface of the container, and the fastening protrusion can be configured to insert into the concave groove of the container and couple to the container. In some examples, the fastening protrusion can include a positioning sensor configured to detect a position of the fastening protrusion relative to the concave groove, and the container can include a reaction member disposed at the concave groove and configured to be detected by the positioning sensor.

In some implementations, the container includes a pair of first sidewalls, where each of the pair of first sidewalls has a hexagonal shape, and the container is one of a plurality of containers that are configured to be stacked on the transporting apparatus. The leg can be configured to rotate to a position between lowermost containers among the plurality of containers to thereby support the plurality of containers.

In some implementations, a height of the main body on the leg at the third position is greater than a height of the main body on the leg at the first position or the second position.

BRIEF DESCRIPTION OF DRAWINGS

The above and other aspects, features, and advantages of the present disclosure will be more clearly understood from the following detailed description, taken in conjunction with the accompanying lead-outs.

DETAILED DESCRIPTION

Hereinafter, one or more implementations of the present disclosure will be described with reference to the accompanying drawings.

A transporting apparatus can be used to load cargo to and unload cargo from transporting vehicles such as air crafts, automobiles, motor vehicles, trains, or other types of vehicles. For example, the transporting apparatus can include a transporting robot.

Figure 1:
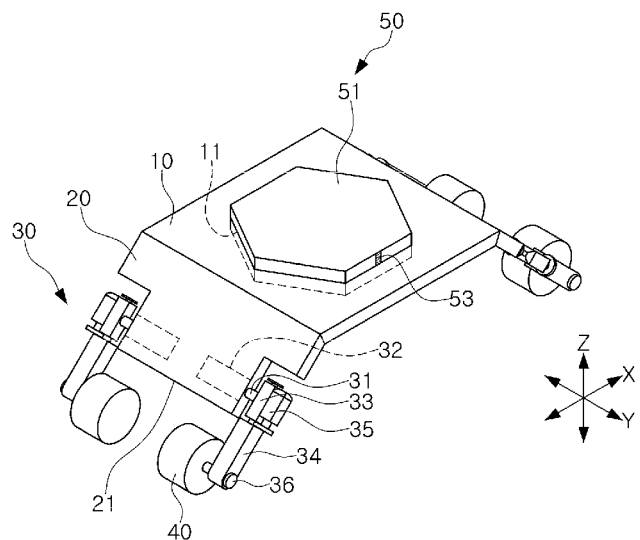
FIG. 1 is a perspective view illustrating an example of a transporting robot.
Figure 2:
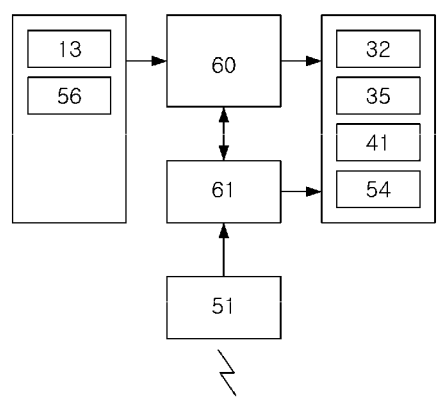
FIG. 2 is a configuration diagram schematically illustrating an example of control components of the transporting robot.

FIG. 1 is a perspective view illustrating an example of a transporting robot. FIG. 2 is a configuration diagram schematically illustrating an example of control elements of the transporting robot.

For example, in some implementations, a transporting robot can include a main body 10, a support frame 20, a leg 30, and a wheel 40. In some examples, the transporting robot can be capable of autonomous driving.

In some implementations, the main body 10 can have a flat polygonal shape as a whole, and the upper surface of the main body can act as a loading region for cargo.

In some examples, as illustrated in FIG. 1, a fastening protrusion 50, installed on an upper surface of the main body 10 to be retractable can be provided. The fastening protrusion will be described later.

The support frame 20 can be respectively coupled to both sides of the main body 10. The support frame can be formed to extend downwardly to be inclined at a predetermined angle with respect to the upper surface of the main body. A lower end 21 of the support frame can support the main body by being in contact with the ground when the leg 30 is folded.

The main body 10 and the support frame 20 can have a predetermined thickness to support a load of cargo or a container 1 for accommodating the cargo. In addition, the main body and the support frame can be made of, for example, a solid material such as metal or plastic. The main body and the support frame can be integrally formed, but the present disclosure is not limited thereto.

The leg 30 can include a rotation shaft 31 rotatably coupled to the support frame 20, a first motor 32 connected to an end portion of the rotation shaft, a bushing 33 fixed to the rotation shaft so as to have an axis extending in a direction perpendicular to an axis of the rotation shaft, an arm 34 having one end portion coupled to the bushing and rotatable, a second motor 35 installed on the bushing and rotating the one end portion of the arm, and a wheel shaft 36 rotatably coupled to the other end portion of the arm.

The arm 34 of the leg 30 can be rotatably mounted with respect to the support frame 20 via the rotation shaft 31. A motor shaft of the first motor 32 can be directly connected to an end portion of the rotation shaft or indirectly connected by a reducer.

Specifically, an axis connecting the support frames 20 on both sides is referred to as a longitudinal axis X of the main body 10, and an axis extending at right angles to the longitudinal axis and parallel to the upper surface of the main body is referred to as a width direction axis Y of the main body.

In this case, the arm 34 can rotate with driving force of the first motor 32 toward the front and rear of the longitudinal axis X with respect to the rotation shaft 31 extending parallel to the width direction axis Y.

In addition, depending on disposition of the bushing 33, the rotation shaft 31 and the arm 34 can be disposed to extend in directions perpendicular to each other.

A motor shaft of the second motor 35 can be connected to one end portion of the arm 34 directly or indirectly by a reducer. This second motor or the second motor and the reducer can act as a steering module for the wheel 40 together with the arm.

The wheel 40 can be installed on a wheel shaft 36 coupled to the other end portion of the arm 34. The wheel can employ, for example, an in-wheel motor 41 in which a motor is mounted in the wheel. By providing such an in-wheel motor, each wheel can be controlled independently, and power loss can be minimized since the motor and the wheel are directly connected.

In addition, since the wheel 40 is directly connected to the arm 34 and has the in-wheel motor 41 therein, when driving, the wheel can minimize a rotation radius, and the wheel can rotate 360 degrees in place.

The first motor 32, the second motor 35, and the in-wheel motor 41 can be electrically connected to the controller 60 of the transporting robot. For example, the controller 60 can include an electric circuit, a processor, a non-transitory memory, a computer, or the like.

In the transporting robot, a traveling direction, a traveling speed, a turning direction, a turning speed, a stop position, elevating/lowering, an emergency stop, and the like can be controlled by the controller 60. For control of such autonomous driving, the transporting robot can be equipped with a charger 61 and various sensors.

The charger 61 can be mounted in any position on the main body 10, and can apply power for driving to the first motor 32, the second motor 35, and the in-wheel motor 41.

For example, when power is applied to the second motor 35 and the in-wheel motor 41 from the charger 61 under the control of the controller 60, so that the second motor and the in-wheel motor rotate forwards and backwards, the arm 34 and the wheel 40 can rotate forwards and backwards, whereby the transport robot can move in a desired direction.

Since various technologies have been proposed and known for a controller to control a transporting robot or a vehicle using various sensors for autonomous driving, a detailed description thereof will be omitted herein.

However, in some examples, the transporting robot may not be limited to being automatically movable. For instance, the transporting robot can be configured to move a predetermined distance by remote control or manually, or some functions of the transporting robot can be implemented by remote control or manual operation.

Figure 3:
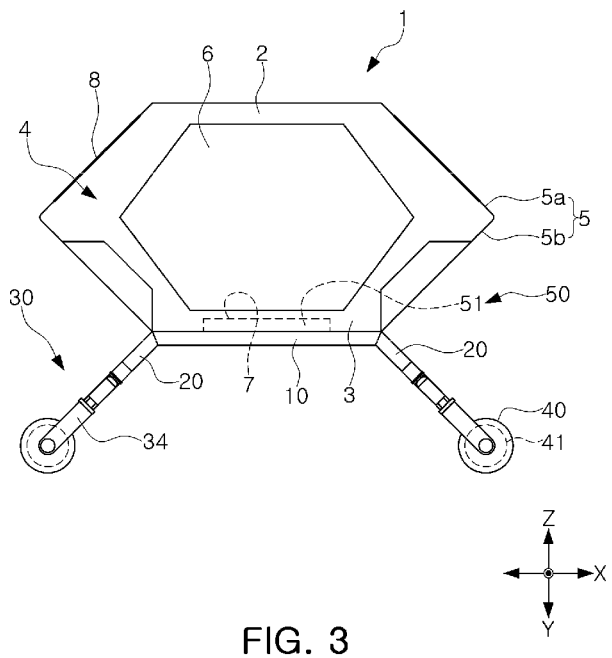
FIG. 3 is one side view illustrating an example of the transporting robot that loads an example of a container.
Figure 4:
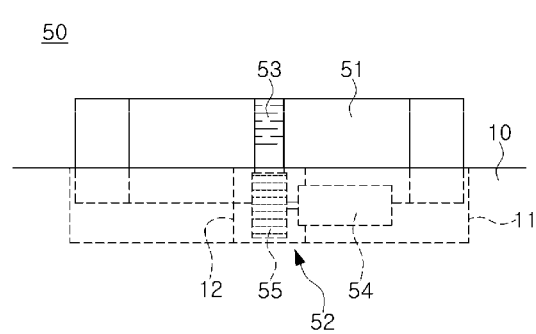
FIG. 4 is a cross-sectional view illustrating an example of the fastening protrusion illustrated in FIG. 1.

FIG. 3 is one side view illustrating a state in which the transporting robot is loading a container. FIG. 4 is a cross-sectional view illustrating the fastening protrusion illustrated in FIG. 1.

A container 1 can be used to safely and easily transport cargo in any shape by a predetermined distance by the transporting robot. FIG. 3 illustrates an example of a container applicable to a transporting robot.

As illustrated, the container 1 can include an upper surface 2, a lower surface 3, a pair of first sidewalls 4, and a pair of second sidewalls 5. The pair of second sidewalls can include an upper inclined surface 5a and a lower inclined surface 5b, respectively.

In some implementations, the pair of first sidewalls 4 can respectively be formed in a hexagonal shape. Accordingly, the container 1 can have a hexagonal cross-section, and can be formed to have a shape of a hexagonal column, substantially lying on its side.

However, the cross-sectional shape of the container 1 is not limited thereto. For example, the cross-sectional shape of the container 1 can be a polygonal cross-section, greater than or equal to a triangle.

In some implementations, except for the first sidewall 4, the upper surface 2, the lower surface 3, and the upper inclined surface 5a and the lower inclined surface 5b, constituting the pair of second sidewalls 5 can be formed in a rectangular shape.

In some examples, the container 1 can be made of, for example, a solid material such as metal or plastic. In addition, the upper surface 2, the lower surface 3, the first side wall 4, and the second side wall 5 of the container can be integrally molded.

At least one of the pair of first sidewalls 4 can be provided with an opening and a door 6 for accommodating and withdrawing cargo in the container 1.

The opening can be formed in a hexagonal shape corresponding to the shape of the first sidewall 4, but the shape of the opening is not limited thereto.

For example, one side of the door 6 and the first sidewall 4 can be connected via a hinge, so that the door can be opened and closed by rotating around the hinge.

The upper surface 2, the lower surface 3, and the sidewalls 4 and 5 can have a predetermined thickness to support a load of the cargo accommodated in inside the container 1 and the container itself.

A concave groove 7 recessed from outwardly to inwardly can be formed on the lower surface 3 of the container 1. In some examples, the transporting robot can include a fastening protrusion 50 that can be shape-fitted and inserted into the concave groove, so that the container can be stably loaded on the main body 10 of the transporting robot.

In some implementations, the container 1 can include a solar photovoltaic module. Such a solar photovoltaic module can include a solar cell panel 8, a converter, and a battery.

The solar cell panel 8 includes small cells made of silicon, or the like. Each cell is a device having a principle that solar rays are incident on a surface thereof, so that separation of charges occurs, and electrical energy is produced by extracting these charges externally. The solar cell panel can be mounted on the upper inclined surface 5a of the second sidewall 5.

A converter can convert a current generated and flowing in the solar cell panel 8. A battery can store electrical energy generated by the solar cell panel, and can provide power to one or more electric components in the container 1 or the transporting robot.

In some examples, a terminal portion electrically connected to the battery can be provided on an inner surface of the concave groove 7 on the lower surface of the container 1.

The transporting robot can further include a fastening protrusion 50 installed in the main body 10 to be retractable. The fastening protrusion can be fastened to the container to fix the container on the main body so that the container 1 accommodating cargo is stably loaded and transported on the main body.

The fastening protrusion 50 can include a groove portion 11 formed in the main body 10; a fastening member 51 that can be accommodated in the groove portion 11; and a driver 52 installed on the main body to reciprocate the fastening member.

The groove portion 11 can be formed to have a polygonal cross-section, such as a hexagonal shape. A through-hole 12 formed to connect the fastening member 51 and the driver 52 can be provided on at least one sidewall or a bottom surface of the groove portion.

The fastening member 51 can be formed of a conductive material, like a metal such as copper, aluminum, or steel, for example, and can be used to not only fix a position of the container 1 but also to transmit electricity. In addition, the fastening member can be electrically connected to a charger 61 through a wire, or the like. Accordingly, the fastening member can be used as a conductor for charging the charger from an external power source or, conversely, for applying power from the charger to an external device.

For example, when the fastening member 51 is inserted into the concave groove 7 on a lower surface of the container to be fastened to the container 1, it is connected to a terminal portion of the container to receive power from the battery of the container, and then can charge the charger 61 of the transporting robot.

A rack and pinion mechanism can be employed as the driver 52. For example, a rack gear 53 can be formed on at least one side surface of the fastening member 51, and a pinion gear 55 connected to a rotation shaft of the third motor 54 can rotate in engagement with the rack gear, so that the fastening member can reciprocate inwardly and outwardly of the groove portion 11.

In this case, the rack and the pinion mechanism can be connected through a through-hole 12 formed in one sidewall of the groove portion 11. In addition, the rack and pinion mechanism can be provided in pairs to implement a stable operation of the fastening member 51.

In addition, as illustrated in FIG. 2, power can be applied from the charger 61 to the third motor 54 under the control of the controller 60, and the third motor can rotate forwards and backwards according to the application of the power. By driving force according to an operation of the third motor, the fastening member 51 can reciprocate, and the fastening member can protrude from the upper surface of the main body 10 or be immersed in the groove portion 11 of the main body.

The configuration of the driver 52 is not limited to the above-described example, and for example, a hydraulic cylinder such as a pneumatic cylinder, an electric actuator such as a solenoid actuator, and the like, having an operating rod can be employed.

The fastening member 51 of the fastening protrusion 50 can be inserted into the concave groove 7 on the lower surface of the container 1.

For this coupling, the fastening protrusion 50 can further include a pair of positioning portions 56 for recognizing a position of a fastening member for a concave groove, so that the fastening member 51 is aligned with the concave groove 7 of the container 1 and can be smoothly inserted into the concave groove.

The positioning portion 56 (refer to FIG. 2) is for aligning positions of the concave groove 7 of the container 1 and the fastening member 51, and can include a position sensor or a proximity sensor and a load sensor, such as an image sensor, an optical sensor, a magnetic sensor, an ultrasonic sensor, and a load cell, for example.

In some implementations, a reaction member can be attached or mounted in or around the concave groove 7 of the container 1 for more reliable detection of these sensors. The reaction member can be formed of various members according to the shape and specification of the sensor.

For example, when the positioning portion 56 is an image sensor, a marker having a predetermined shape and color can be used as a reaction member. When the positioning portion is an optical sensor, a reflecting plate reflecting light or a corresponding sensor emitting or receiving light can be used as a reaction member. In addition, when the positioning portion is a magnetic sensor, a permanent magnet or a ferromagnetic material can be used as the reaction member.

When the container 1 is disposed on the transporting robot, sensors constituting the pair of positioning portions 56 simultaneously detect corresponding reaction members of the container, the controller 60 can operate the driver 52 based on the sensing signals so that the fastening member 51 of the fastening protrusion 50 is driven.

Figure 5:
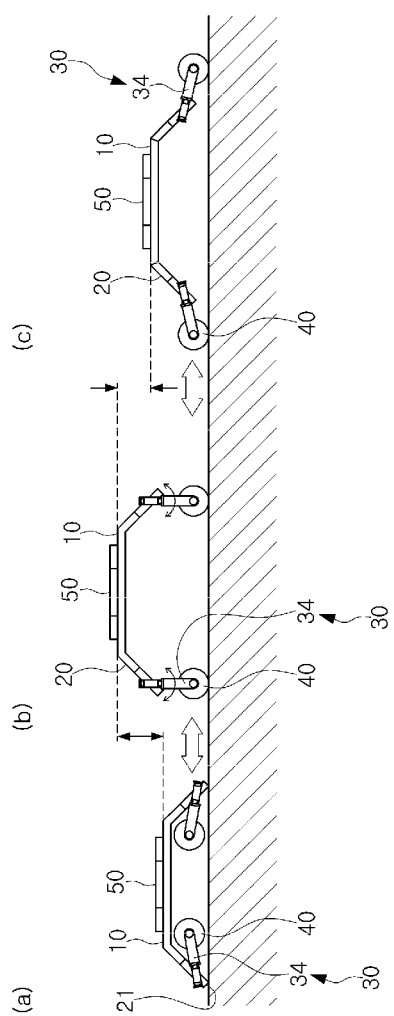
FIG. 5 illustrates an example of a process of adjusting a height of a main body of the transporting robot.

FIG. 5 illustrates views (a)-(c) of an example of a process of adjusting a height of the main body of the transporting robot.

When the first motor 32 rotates forwards and backwards, the arm 34 rotates about the rotation shaft 31, and the leg 30 can be folded, raised, or unfolded.

For example, as illustrated in (a) of FIG. 5, in a state in which the leg 30 is folded, the lower end 21 of the support frame 20 is in contact with the ground, and the wheel 40 installed in the other end portion of the arm 34 is located between the support frames below the main body 10.

In a state in which the leg 30 is folded, when the first motor 32 of each leg 30 rotates in a forward direction, the arm 34 rotates about the rotation shaft 31, and accordingly, the leg can be raised.

As illustrated in (b) of FIG. 5, in a state in which the leg 30 is upright, the lower end 21 of the support frame 20 and the main body 10 reach a maximum height in a height direction Z from the ground, and the wheel 40 is in contact with the ground.

In a state in which the leg 30 is raised, when the first motor 32 of each leg 30 further rotates in a forward direction, the arm 34 rotates in the same direction about the rotation shaft 31. Accordingly, the legs can be spread out to both sides of the main body 10.

As illustrated in (c) of FIG. 5, in a state in which the leg 30 is unfolded, the lower end 21 of the support frame 20 is located somewhat higher than it is in a state in which the leg is folded and is not in contact with the ground. The wheel 40 is deviated from a position below the main body 10, and is in contact with the ground.

In a state in which the leg is raised, when the first motor 32 of each leg 30 rotates in a reverse direction, the arm 34 rotates in the opposite direction about the rotation shaft 31, and accordingly, the wheel 40 is positioned between the support frames 20 under the main body 10 while the leg is folded again.

Similarly, in a state in which the leg is unfolded, when the first motor 32 of each leg 30 rotates in a reverse direction, the arm 34 rotates in the opposite direction about the rotation shaft 31, and accordingly, the leg can be gradually raised again. When the first motor further rotates in the reverse direction, the leg can be folded again.

In some examples, for normal driving, the leg 30 can be slightly unfolded so that the inclination of the arm 34 is equal to the inclination angle of the support frame 20.

As described above, the leg 30 can be rotatably installed with respect to the support frame so that a height of the body can be adjusted. When receiving a container accommodating cargo, or conversely, unloading the container to another mobility or other device, the transporting robot can be positioned stably and can be raised and lowered to an appropriate height.

In some examples, a position shown in (a) of FIG. 5 can define a first position of the leg, a position shown in (c) of FIG. 5 can define a second position of the leg, and a position shown in (b) of FIG. 5 can define a third position of the leg between the first and second positions.

Figure 6A:
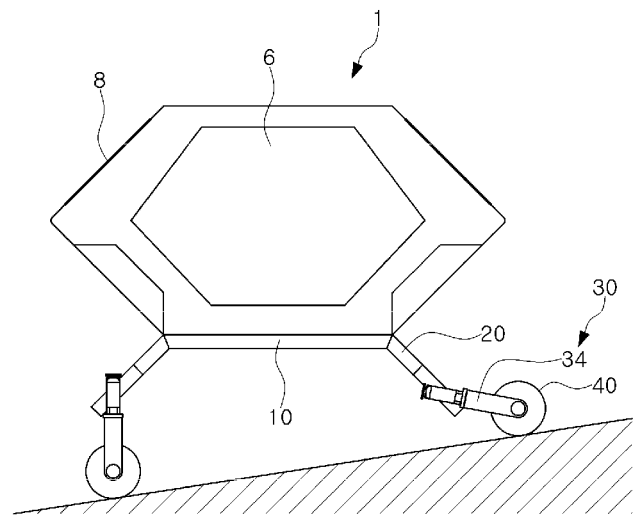
FIGS. 6A and 6B are diagrams illustrating an example of a process for the transporting robot to maintain a horizontal attitude on a slope.
Figure 6B:
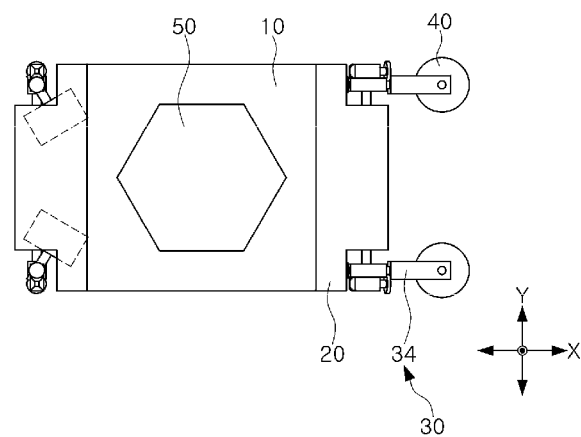

FIGS. 6A and 6B are diagrams illustrating a process in which a transporting robot maintains in a horizontal attitude on a slope.

The plurality of legs 30 have separate first and second motors 32 and 35 operating separately of an operation of other legs for driving the corresponding leg. The plurality of wheels 40 can also include a separate in-wheel motor 41 operating separately of an operation of other wheels for driving the corresponding wheel. In addition, as described above with reference to FIG. 2, each of the first motor 32, the second motor 35, and the in-wheel motor 41 can be electrically connected to the controller 60 of the transporting robot and separately controlled by the controller.

The transporting robot can include at least one acceleration sensor 13 (refer to FIG. 2) to maintain the main body 10 in a horizontal attitude. The acceleration sensor can determine a degree of inclination of the main body by dividing gravitational acceleration acting on the acceleration sensor into three vectors (X, Y, Z axes) and measuring the magnitude.

As illustrated in FIG. 6A, in case the transporting robot is placed on a slope or on an irregular ground, when the acceleration sensor 13 senses the inclination of the main body 10, based on a sensing signal of the acceleration sensor, the controller 60 can operate at least the corresponding first motor 32 to raise a leg, inclined downwardly, among the legs 30.

Furthermore, as illustrated in FIG. 6B, when the transporting robot needs to be stopped on a slope, the controller 60 can operate the second motor 35 of a pair of legs connected to at least one support frame 20 among the legs 30 to rotate the corresponding arm 34 so that both wheels 40 are disposed at a predetermined angle to be symmetrically to each other with respect to a longitudinal axis X, and so that a wheel shaft 36 is disposed at a predetermined angle with respect to the longitudinal axis X.

Accordingly, a position of the transporting robot can be fixed in a state stable without sliding while maintaining a horizontal attitude, even on a slope or on an irregular ground.

Figure 7:
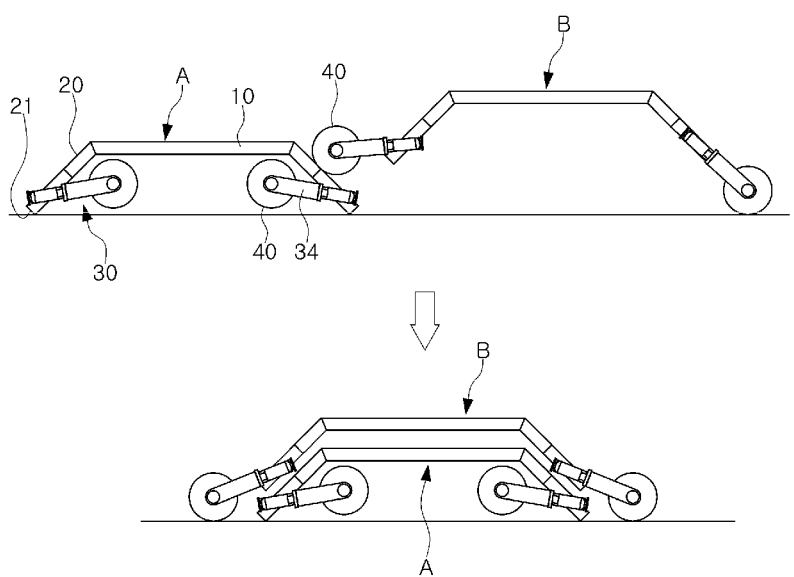
FIG. 7 is a view illustrating an example of a process of stacking a plurality of transporting robots.

FIG. 7 is a view for illustrating a stacking process when a plurality of transporting robots are provided.

When a plurality of transporting robots (A and B) are provided, the plurality of transporting robots can be stacked as shown.

First, any one of the first transporting robot (A) has legs 30 thereof in a folded state so that the lower end 21 of the support frame 20 is in contact with a ground, and the wheel 40 installed at the other end portion of the arm 34 is positioned between the support frames below the main body 10. Accordingly, the main body of the first transporting robot is located at a minimum height in a height direction (Z) from the ground.

Then, another second transporting robot (B) move onto the first transporting robot (A) placed on a ground to a minimum height. In this case, since the lower end 21 of the support frame 20 of the first transporting robot is in contact with a ground, it can act as an inclined surface connecting from the ground to the upper surface of the main body 10 of the first transporting robot.

Due to this, a pair of wheels 40 on one side of the second transporting robot (B) move onto one side of the support frame 20 of the first transporting robot (A) to reach the upper surface of the first transporting robot (A).

The fastening protrusion 50 of the main body 10 of the first transporting robot (A) can be disposed in a groove portion 11, so that the upper surface of the main body of the first transporting robot (A) forms a flat surface. Accordingly, the pair of wheels 40 of the second transporting robot (B) can continue to travel on the upper surface of the main body of the first transporting robot without interference, and then slide down on the other side of the support frame 20 of the first transporting robot.

As described above, the second transporting robot (B) can be stacked on the first transporting robot (A), thereby minimizing a storage space of the transporting robots, as well as achieving easy transportation when transporting a plurality of transporting robots.

Figure 8:
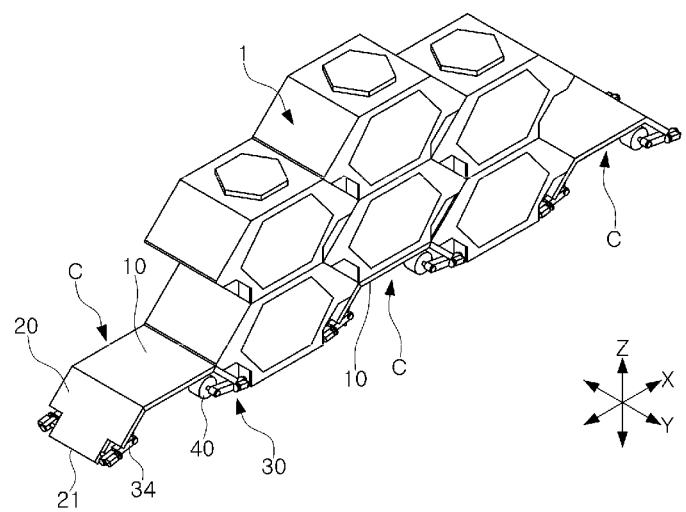
FIG. 8 is a perspective view illustrating an example of a transporting robot that is used as a support member of a plurality of containers.

FIG. 8 is a perspective view illustrating a state in which a transporting robot is used as a support member when a plurality of containers are stacked.

When a plurality of containers 1 having a hexagonal cross-section are provided, the plurality of containers can be stacked as illustrated.

When stacked, rectangular surfaces of adjacent containers 1, i.e., an upper surface 2, a lower surface 3, an upper inclined surface 5a and a lower inclined surface 5b are in surface-contact with each other, so that there is no space between the contacting surfaces and a load applied to the surfaces can be distributed.

When a plurality of containers having a hexagonal cross-section are stacked in this manner, the transporting robot can be used as the support member (C).

In order to be used as the support member (C), the transporting robot has legs 30 thereof in a folded state, so that a lower end 21 of a support frame 20 is in contact with a ground, and a wheel 40 installed at the other end portion of an arm 34 is positioned between the support frames below the main body 10. Accordingly, the main body of the transporting robot is located at a minimum height from the ground.

After the containers are maintained at a certain distance from each other, between the lowermost containers 1, when a transporting robot having a minimum height, that is, the support member (C) is located between the containers of the lowermost layer, another container can be placed on the support member and can be staggeringly stacked by half the height of the containers.

The size and shape of the upper surface of the main body 10 are the same as the size and shape of a lower surface of the container 1. In addition, inclination of the support frame 20 to a ground is the same as inclination of the lower inclined surface 5b of the second sidewall 5 of the container 1 to a ground. A distance between the lower ends 21 of both support frames is equal to a maximum length (X direction) of the container 1.

Since the transporting robot acting the support member (C) is in surface-contact with the lower surface 3 and lower inclined surface 5b of the adjacent containers 1, there is no space between the contacting surfaces and a load applied to the surface can be dispersed.

Accordingly, the transporting robot can help to minimize the use of loading space when stacking containers and to stably distribute a weight of containers.

For this reason, the transporting robot can be linked and applied to land structures such as smart buildings or smart warehouses as well as mobility for transporting cargo.

In some implementations, the transporting robot can transport a modularized container accommodating cargo to one or more destinations, thereby obtaining an effect that logistics and transportation can be performed rapidly and efficiently.

While the example implementations have been illustrated and described above, it will be apparent to those skilled in the art that modifications and variations could be made without departing from the scope of the present disclosure as defined by the appended claims.

Accordingly, the implementations disclosed in the present specification and drawings are not intended to limit the technical spirit of the present disclosure but to explain, and the scope of the technical spirit of the present disclosure is not limited by these implementations. The protection scope of the present disclosure should be construed by the following claims, and all technical ideas within the scope equivalent thereto should be construed as being included in the scope of the present disclosure.

What is claimed is:

1. A transporting apparatus, comprising:
a main body having an upper surface that is flat;
a plurality of support frames that are disposed at sides of the main body and extend downward from the main body, each of the plurality of support frames being inclined with respect to the upper surface of the main body;
a plurality of legs that are rotatably disposed at each of the plurality of support frames; and
a plurality of wheels, each of the plurality of wheels being disposed at an end of one of the plurality of legs,
wherein each of the plurality of legs is configured to rotate to (i) a first position below the main body, (ii) a second position outside of the main body, and (iii) a third position between the first position and the second position.

2. The transporting apparatus of claim 1, wherein each of the plurality of legs comprises:
- a rotation shaft rotatably coupled to one of the plurality of support frames;
- a first motor connected to an end portion of the rotation shaft;
- a bushing that is fixed to the rotation shaft and extends in a direction perpendicular to the rotation shaft;
- an arm having a first end portion coupled to the bushing, the arm being configured to rotate relative to one of the plurality of support frames;
- a second motor disposed at the bushing and configured to rotate of the arm, the second motor being connected to the first end portion of the arm; and
- a wheel shaft that is rotatably coupled to a second end portion of the arm and supports one of the plurality of wheels.

3. The transporting apparatus of claim 2, wherein the wheel comprises an in-wheel motor disposed in the wheel.

4. The transporting apparatus of claim 3, further comprising:
- a controller that is electrically connected to the first motor, the second motor, and the in-wheel motor; and
- a charger disposed at the main body and configured to provide power to at least one of the first motor, the second motor, or the in-wheel motor.

5. The transporting apparatus of claim 1, wherein
wherein the plurality of support frames have (i) upper ends that are connected to the main body and (ii) lower ends that extend downward from the upper ends and away from each other.

6. The transporting apparatus of claim 5, wherein
the lower ends of the plurality of support frames are configured to:
- based on the leg being disposed at the first position below the main body, contact a ground such that the wheel is accommodated at a position below the main body and between the plurality of support frames;
- based on the leg being disposed at the second position outside of the main body, be disposed at an outside of the support frame to thereby deviate the wheel from the position below the main body; and
- based on the leg being disposed at the third position in an upright position with respect to the ground, define maximum heights of the support frame and the main body from the ground.

7. The transporting apparatus of claim 5, wherein the transporting apparatus is one of a plurality of transporting apparatuses including a first transporting apparatus and a second transporting apparatus, and
wherein the second transporting apparatus is configured to, based on legs of the first transporting apparatus rotating to a position below a main body of the first transporting apparatus, move onto the first transporting apparatus and stack on the first transporting apparatus.

8. The transporting apparatus of claim 4, further comprising an acceleration sensor electrically connected to the controller and configured to maintain the main body in a horizontal attitude,
wherein the controller is configured to, based on the acceleration sensor sensing an inclination of the main body with respect to the horizontal attitude, control the first motor to raise or lower at least one of the plurality of legs.

9. The transporting apparatus of claim 1, further comprising a fastening protrusion disposed at the upper surface of the main body, the fastening protrusion being configured to protrude upward relative to the upper surface of the main body and to retract downward into the main body, the fastening protrusion being configured to couple to a container that is configured to accommodate cargo.

10. The transporting apparatus of claim 9, wherein the main body defines a groove portion configured to receive the fastening protrusion, and
wherein the fastening protrusion comprises:
- a fastening member disposed in the groove portion, and
- a driver disposed in the main body and configured to reciprocate the fastening member relative to the upper surface of the main body.

11. The transporting apparatus of claim 10, further comprising a charger disposed at the main body and configured to store electric energy,
wherein the fastening member is made of a conductive material and electrically connected to the charger in the main body.

12. The transporting apparatus of claim 11, wherein the fastening member defines a rack gear on at least one surface thereof, and
wherein the driver comprises:
- a motor configured to receive power from the charger, the motor comprising a rotation shaft; and
- a pinion gear engaged with the rack gear and configured to rotate the rack gear based on rotation of the rotation shaft.

13. The transporting apparatus of claim 9, wherein the container defines a concave groove that is recessed upward from a lower surface of the container, and
wherein the fastening protrusion is configured to insert into the concave groove of the container and couple to the container.

14. The transporting apparatus of claim 13, wherein the fastening protrusion further comprises a positioning sensor configured to detect a position of the fastening protrusion relative to the concave groove, and
wherein the container comprises a reaction member disposed at the concave groove and configured to be detected by the positioning sensor.

15. The transporting apparatus of claim 13, wherein the container includes a pair of first sidewalls, each of the pair of first sidewalls having a hexagonal shape,
wherein the container is one of a plurality of containers that are configured to be stacked on the transporting apparatus, and
wherein the leg is configured to rotate to a position between lowermost containers among the plurality of containers to thereby support the plurality of containers.

16. The transporting apparatus of claim 1, wherein a height of the main body on the leg at the third position is greater than a height of the main body on the leg at the first position or the second position.

* * * * *